United States Patent [19]

Gaillot et al.

[11] 4,136,707
[45] Jan. 30, 1979

[54] FIRE-RESISTING DEVICE FOR PIPING EXTENDING THROUGH A WALL

[75] Inventors: Jean-Paul Gaillot, Laxou; Bernard P. Kirch, Pont-a-Mousson, both of France

[73] Assignee: Pont-a-Mousson S.A., Nancy, France

[21] Appl. No.: 827,416

[22] Filed: Aug. 24, 1977

[30] Foreign Application Priority Data

Aug. 31, 1976 [FR] France .................................. 76 26232
Nov. 5, 1976 [FR] France .................................. 76 33440

[51] Int. Cl.² ............................................. F16K 17/36
[52] U.S. Cl. .................................... 137/75; 52/1;
52/232; 137/67; 137/360; 137/628; 251/4
[58] Field of Search ............. 251/4, 5; 137/67, 72–77, 137/360, 361; 52/1, 232; 169/56

[56] References Cited

U.S. PATENT DOCUMENTS

| 3,726,050 | 4/1973 | Wise et al. ......................... 137/75 X |
| 3,904,111 | 9/1975 | Petersson ........................... 137/67 X |
| 4,072,159 | 2/1978 | Kurosawa ............................ 137/67 |

FOREIGN PATENT DOCUMENTS 184573  9/1966  U.S.S.R. ........................................ 251/5

Primary Examiner—Martin P. Schwadron
Assistant Examiner—Richard Gerard
Attorney, Agent, or Firm—Sughrue, Rothwell, Mion, Zinn and Macpeak

[57] ABSTRACT

The device comprises an annular case having a first portion which projects from the wall and a second portion which is embedded in the wall. A tubular element connected to two pipes of the piping defines a passage through the case. The tubular element has a first section and a second section respectively located in the first portion and second portion of the case. The tubular element is of a material which is rigid at ordinary temperature and softens under the action of heat. At least the first section is of a fusible material having a distinct point of fusion. The first portion of the case is provided with means for instantaneously closing the passage as soon as the first section has disappeared. The second portion of the case is filled with a material which swells radially under the action of heat.

26 Claims, 11 Drawing Figures

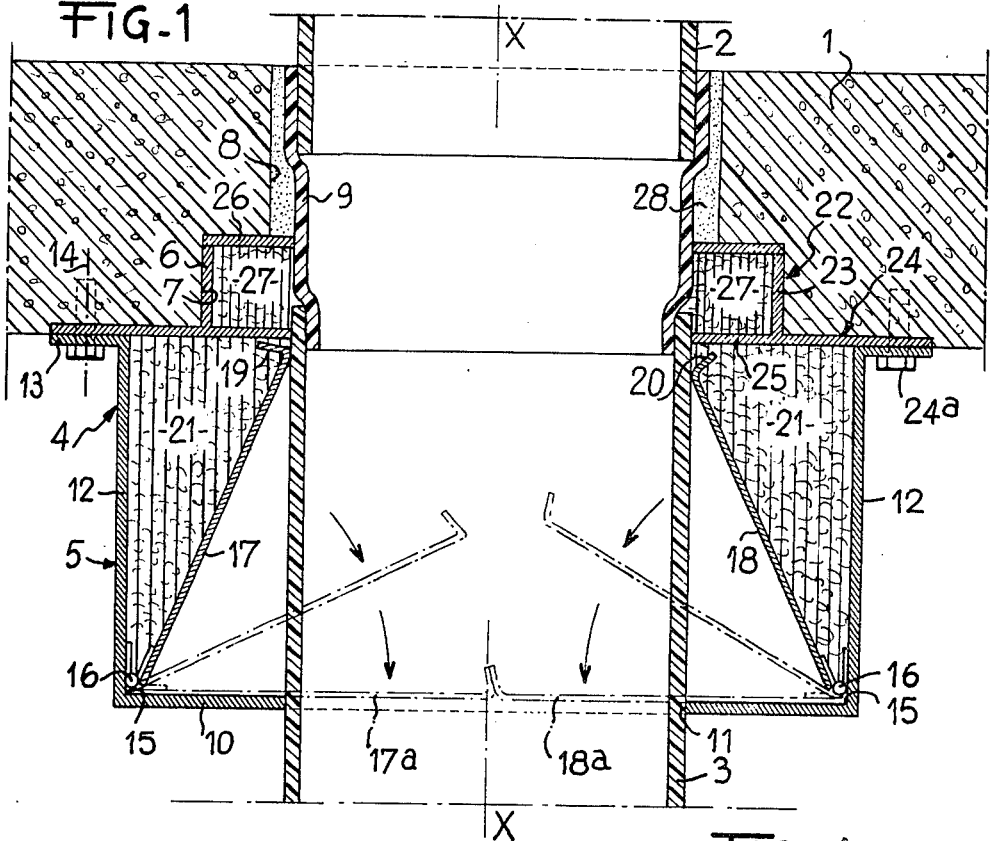
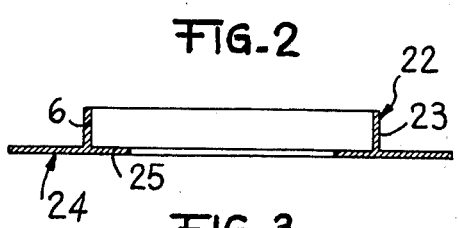
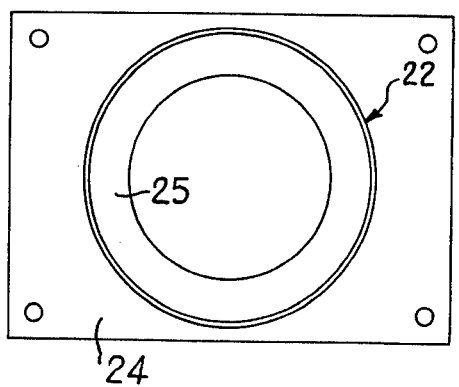
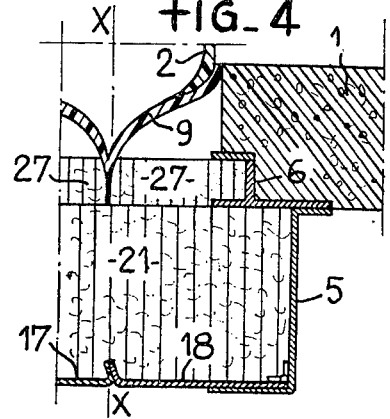
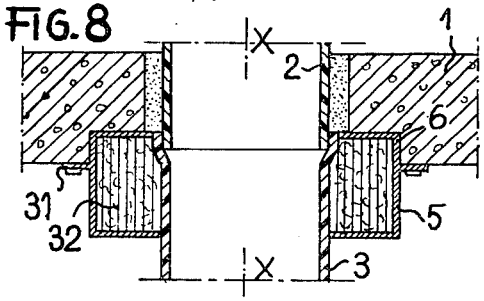

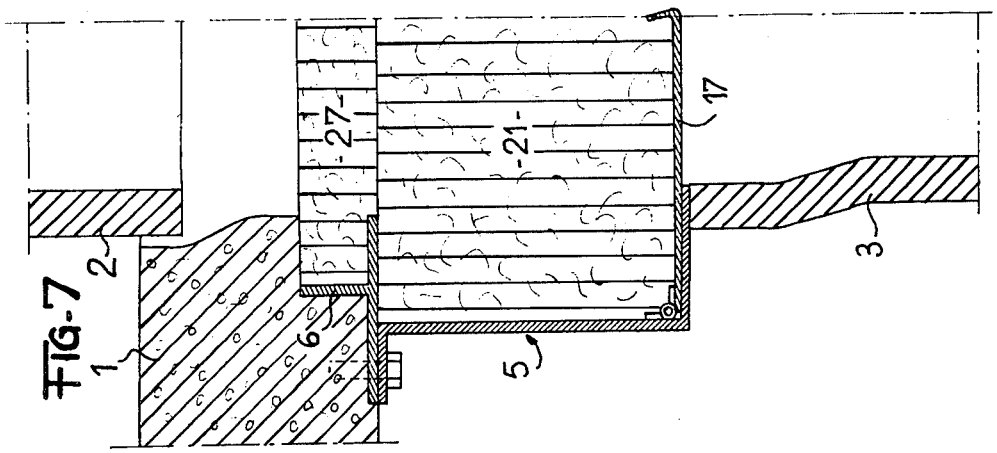
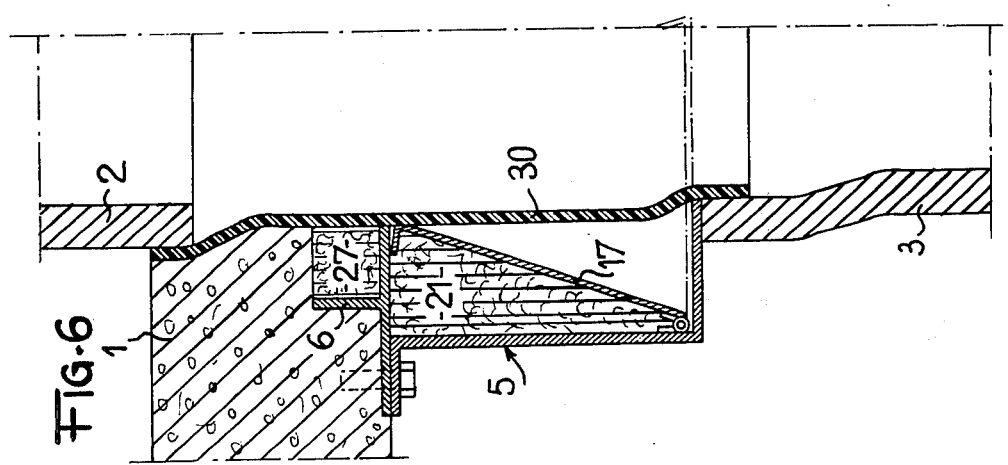
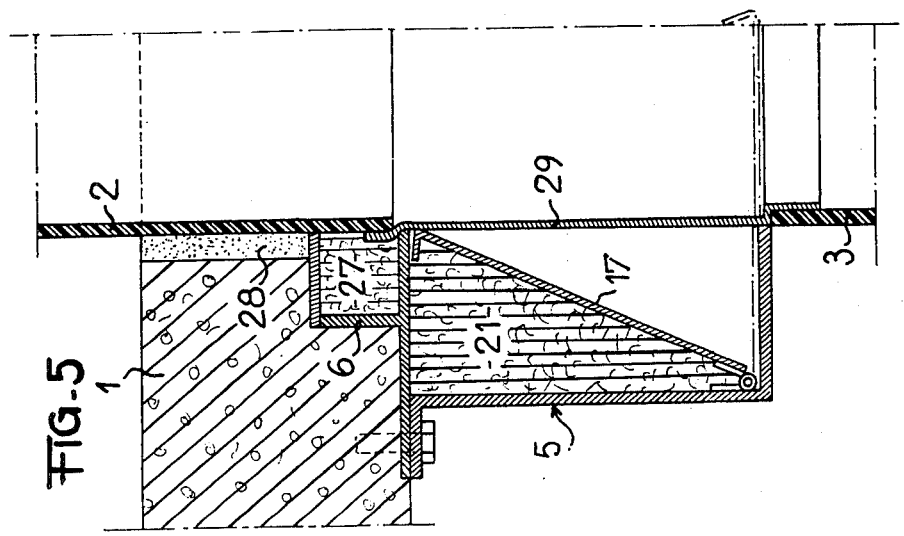

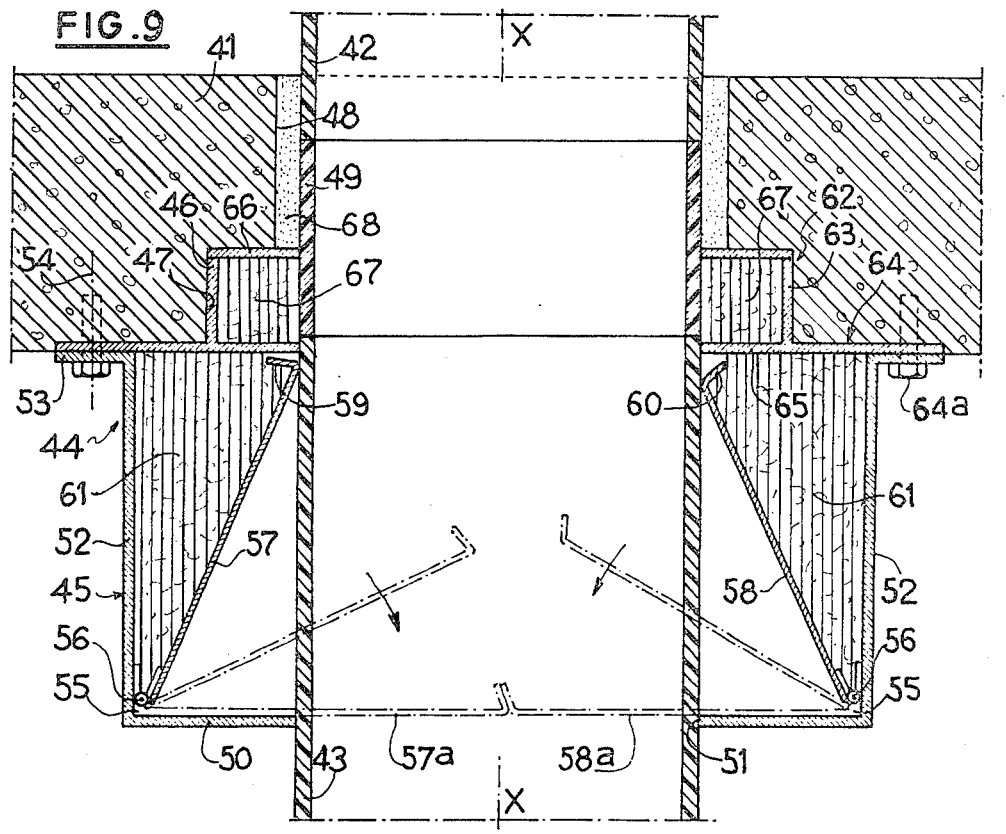
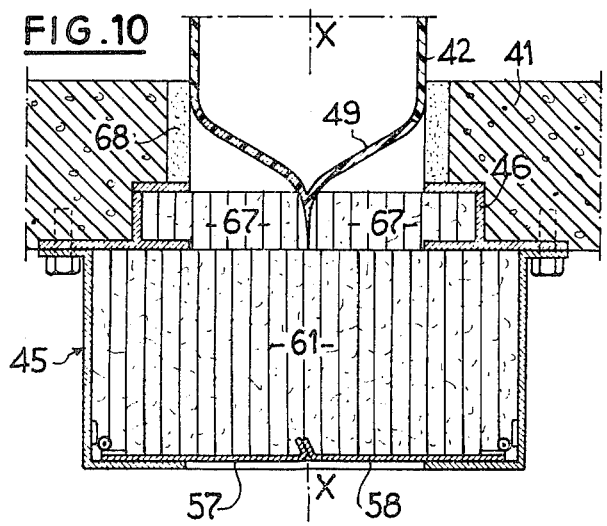
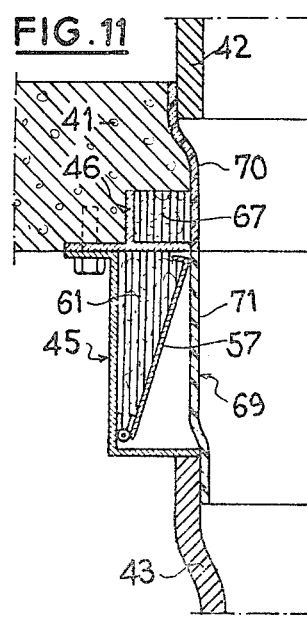

FIRE-RESISTING DEVICE FOR PIPING EXTENDING THROUGH A WALL

The present invention relates to a fire-resisting device for interconnecting two pipes of piping extending through a wall and in particular a horizontal flooring.

This device is of more particular interest in respect of pipes having a rather large diameter and in particular those designated in the building trade by the term large drain pipes.

When these large drain pipes are of cast iron, of course fire does not damage them, but they can perform, even through a fire-resisting wall, the function of a thermal bridge which is sufficient for igniting combustible materials even on the side of the wall opposed to the fire. It is therefore of interest to be able to interrupt such pipes in the region of a fire-resisting wall.

Large drain pipes of plastics material are encountered more and more often. In this case, a little after the start of a fire the plastics piping has melted and there is in the place thereof a hole by which the fire (flames or hot gases) is capable of being propagated even if the flooring itself has the required characteristics for performing a fire-resisting function during the regulation period of time, which is usually estimated as being equal to at least 90 minutes. For some time, it has been attempted to interrupt these plastics pipings by employing a foam which is refractory — at least for a time — this foam being obtained from a material which is capable of swelling radially under the effect of the heat of the fire and consequently gradually crushes the pipe as the latter softens or disappears. These devices give satisfaction when the pipes have a small diameter. On the other hand, in respect of diameters of the order of 150 mm which are currently met with in respect of large drain pipes, and especially if the pipe is liable to burn, the flames and the hot gases are liable to be propagated before the swellable material has been able to completely close off the place initially occupied by the piping.

An object of the invention is to provide a fire-resisting device which is effective for large drain pipes irrespective of the fact that they are of plastics material or are metallic.

According to the invention, there is provided a device of the aforementioned type comprising an annular case having a first portion which projects from the wall and a second portion which is embedded in said wall, there being provided a passage through the case, which passage is defined by a tubular element which is connected to the two pipes and comprises a first section and a second section located respectively in the first portion and the second portion of the case, said tubular element being of a material which is rigid at ordinary temperature and softens under the effect of heat, at least said first section being of a fusible material having a distinct fusion point, the first portion of the case being provided with means for instantaneously closing the passage as soon as said first section has disappeared, and the second portion of said case being filled with a material which is capable of radially swelling under the action of heat.

Thus, in the event of a fire, there is first an instantaneous closure outside the wall, then, in a second stage, the heat reaches the swellable material which is relatively insulated by the wall and this material produces a second closure.

In one embodiment, said instantaneous closing means comprise at least one flap pivotably mounted on the first portion of the case and maintained in a raised position by bearing against said first section. In this case, preferably, the space between the flap and the first portion of the case is filled with a material capable of radially swelling under the effect of heat. This swellable material thus provides a protecting mattress which leaves the second portion of the case still more time for expanding and which, if the wall is a horizontal flooring, provides a support therefore.

In another embodiment, said instantaneous closing means comprise a first material capable of swelling under the action of heat combined with a second material which gives off heat under the action of an outside supply of heat, said two materials filling the first portion of the case.

When it concerns interconnecting two pipes of polypropylene, it is advantageous to arrange that said second section of the tubular element be of a material which softens under the effect of heat without running before it is decomposed. Polyvinyl chloride, or PVC, may be employed as the material having this property.

However, PVC, although it performs very well the function for which it is intended, gives off about 57% of its weight in the form of chlorine when it is decomposed. Notwithstanding the short length of the section of PVC, this emanation in the course of a fire could be troublesome since it is toxic and corrosive. This is why it is advantageous to replace the PVC by a material which has a somewhat similar behaviour under the effect of heat but does not give off any troublesome gas. In this respect, the use of a polyolefin having a mineral material filler has been found particularly appropriate for said second section.

Further features and advantages of the invention will be apparent from the ensuing description which is given solely by way of example with reference to the accompanying drawings in which:

FIG. 1 is an elevational and diametral sectional view of a device according to the invention applied to an arrangement in which a pipe of plastics material extends through a horizontal flooring;

FIG. 2 shows a similar view of one of the parts of the device;

FIG. 3 is a plan view of this part;

FIG. 4 is a half elevational and sectional view of the state of the device after operation;

FIG. 5 is a half elevational and sectional view of a modification of the device shown in FIG. 1 applied to another type of plastics material;

FIG. 6 is a half elevational and sectional view of another modification of the device shown in FIG. 1 adapted for cast iron piping;

FIG. 7 shows in a similar way this device after operation;

FIG. 8 is an elevational and diametral sectional view of another embodiment of the device according to the invention;

FIG. 9 is an elevational and diametral sectional view of a modification of the device according to the invention applied to an arrangement in which a pipe of plastics material extends through a horizontal flooring;

FIG. 10 is an elevational and sectional view of the device shown in FIG. 9 after operation, and FIG. 11 is a half elevational and diametral sectional view of a modification of the device shown in FIG. 9 adapted for cast iron piping.

In all the illustrated embodiments, the fire-resisting device according to the invention is adapted to equip a vertical piping having an axis X—X when it passes through a horizontal thick flooring 1 which has a fire-resisting function, and more particularly to interconnect two pipes 2 and 3 of this piping. This device comprises a metallic annular case 4 which has an axis X—X and is of a material substantially non deformable by the effect of heat, for example of sheet steel, and has a first portion or housing 5 which is completely located under the flooring and a second portion or ring 6 which is embedded in a recess or cylindrical counterbore 7 formed in the lower part of the flooring. This recess 7 has a diameter larger than the aperture 8 provided in the flooring for the passage of the piping 2–3. The case 4 is defined internally by a tubular element comprising the ends of the pipes 2–3 and/or sleeves connected thereto and defining through said case and through the flooring a passage which has an axis X—X and roughly the diameter of the piping 2–3. The connections are of the socket type. The sealing devices may be of any appropriate known type. As they are not concerned by the invention, they have not been shown in the drawings for reasons of clarity.

In the embodiment shown in FIG. 1, the vertical piping 2–3 is of polypropylene commercially available under the trademark "Avalene." The pipes 2 and 3 slightly penetrate the upper portion and the lower portion of the flooring. A sleeve 9 of polyvinyl chloride interconnects the pipes 2 and 3.

The description will refer in succession to the housing 5 in contact with the lower face of the flooring and then to the swellable ring 6 disposed in the recess 7.

The housing 5 is parallel-sided with a substantially rectangular base 10 perpendicular to the pipes 2 and 3, the housing having a thickness, measured axially, of the order of one half of the other two dimensions of the housing. The lower base 10 of the housing has in the centre thereof a circular opening 11 for the passage of the pipe 3. The section of the Figure is taken perpendicular to two of the vertical opposed walls 12 of the housing. This housing comprises, in the upper part thereof at the ends of the walls 12, flanges 13 provided with apertures having an axis 14 for the purpose of securing the housing under the flooring. Inside the housing 5, two opposed lower edges 15 are provided with hinges 16 on which two flaps 17 and 18 are pivotably mounted. These flaps have such length that their ends 19, 20 opposed to the hinges 16 are capable of coming into contact with each other when the flaps are swung-down to a horizontal position. These ends 19 and 20 are provided with a flange, namely a flange 19 at a right angle, and a flange 20 at an obtuse angle. These two flanges, owing to the oblique contact that they achieve in the swung-down position of the flaps shown in dot-dash line in FIG. 1, impart a good sealing property to these flaps. At rest (FIG. 1), the flaps 17 and 18 are maintained in a raised position by the fact that their free edges bear against the pipe 3. The space between the flaps 17 and 18 and the facing vertical walls 12 is occupied by masses 21 constituted by vertical plates of a swellable material placed under a plastics film. This material is an aqueous sodium silicate sold under the trademark "palusol" and has the property of swelling in a direction perpendicular to the plane of the plates and becoming foamed under the action of heat.

The ring 6 is supported in the flooring by a sheath 22 having a flange the detail of which is shown in FIGS. 2 and 3. This sheath has in the upper part a cylindrical portion 23 having a diameter which is such that it defines, around the pipe, an annular space whose radial width is roughly equal to one fifth of the diameter of this pipe. In the lower part, the sheath 22 has a radial flange 24. Inside the cylinder 23 the flange 24 constitutes a washer 25 which defines in the downward direction the space provided around the pipe by the ring 6 and surrounds the pipe 3. Outside the cylinder 23, the flange 24 has apertures having the same axes 14 as the apertures of the flanges 13 of the lower housing 5 so that it is possible to secure simultaneously to the lower face of the flooring, by means of screws $24^a$, the sheath 22 and the housing 5. A planar collar 26 closes the ring 6 in the upper part thereof and is internally in contact with the sleeve 9. The annular space defined by the ring 6 and the sleeve 9 is filled with "Palusol" 27 which is wound in a spiral and protected by a plastics film.

Note that, by way of a modification, the collar 26 may be eliminated since its sole function is to protect against dampness the "Palusol" of the ring 6 which is already protected by a plastics film of polyethylene.

Between the aperture 8 of the flooring 1 and the extension of the sleeve 9 of polyvinyl chloride, a packing of plaster 28 completely closes the flooring around the pipe.

The device just described operates in the following manner when a fire breaks out under the flooring 1.

At the start of the fire, very rapidly, after at the most a few minutes, the lower pipe 3 is destroyed by fusion, without leaving any trace, up to the level of the flooring 1. The space between the flaps 17 and 18 is consequently cleared and the flaps, as they are no longer supported, immediately swing down under the effect of their weight and form at the lower end of the housing 5 a metallic closure such as shown at $17^a$, $18^a$ in FIG. 1. Simultaneously, as the housing 5 is directly exposed to the heat, the swellable masses 21 swell radially until they fill the whole of the housing. In doing so, they may aid the flaps to swing down and create a first fire-resisting mattress.

As the fire continues to develop, the heat progressively reaches the ring 6 which is protected to a certain extent by the flooring 1 and the housing 5 filled with swollen material. The sleeve 9 consequently starts to soften whereas, under the effect of the same heat, the swellable mass 27 starts to swell. There is consequently a progressive constriction or throttling of the sleeve 9 until complete closure of the piping, this sleeve being reduced finally to a small carbonaceous mass on the axis of the piping. The device is then in the state shown in FIG. 4.

It will be understood that the swellable mass 27 is held at the level of the flooring by the metallic washer 25. Moreover, when this mass starts to expand, the whole of the housing 5 is already filled with foam and there is no risk of the component plates of the mass 25 falling and consequently reducing the capacity of the sleeve 9 to be constricted and thereby close in this region.

The device thus operates in two main stages: an instantaneous closure by the flaps, then a throttling in the region of the ring 6. The material 21 increases the effective time of the device, but the essential feature resides in the partial and temporary insulation of the ring 6 in order to allow it sufficient time to swell, this time being relatively long for large drain pipes. In certain applications, the material 21 could therefore be eliminated and possibly replaced by a mechanical device for swinging down the flaps, for example springs.

Moreover, it is of interest to make the sleeve 9 from polyvinyl chloride. In contradistinction to other plastics material, such as polypropylene or polyethylene, the fusion point of which is distinct, PVC softens progressively under the effect of heat before becoming degraded. These qualities enable it to perform better the function of maintaining the mass 27 than a plastics which is more distinctly combustible, such as polyethylene or propylene. By way of a modification, the same result would be obtained with the sleeve 9 made from a metallic alloy or a metal fusible below 400° C such as "Zamak" (trademark) or antimonious lead. Indeed, the point of fusion of such a material would in any case be much higher than that of propylene.

This is why when the large drain pipe is itself of PVC (FIG. 5), the pipe 2 may be extended to the bottom of the flooring, a sleeve 29 of polypropylene or polyethylene connecting this pipe 2 through the housing 5 of the pipe 3. In this way, the same arrangement in FIG. 1 is resumed in the housing and the ring, which results in an identical operation. The pipe section located in the housing 5 disappears very rapidly without leaving carbonaceous traces which might hinder the correct closure of the flaps which would otherwise be the case if the pipe 3 of PVC extended through the housing. On the other hand, the section located at the level of the ring 6 softens sufficiently to avoid opposing complete closure under the effect of the expansion of the swellable mass 27 but does not run, which enables it to retain this mass during the time during which the housing 5 is not yet filled with foam.

The swellable masses 21 and 27 may be in the form of leaves or laminations by making them by means of a winding in which alternate the swellable sheet and tinsel or foil for example of aluminium. They may also be constituted by simple vertical plates.

According to tests carried out with a large drain pipe of polypropylene, a sleeve 9 of polyvinyl chloride and swellable masses not in the form of leaves, the times where the following (nominal diameter of the piping: 150 mm):

Closure of the flaps 17,18 : 2 to 5 min;
Closure at the level of the ring 6 : 20 to 40 min;
Maintenance of the fire-resisting character of the flooring : 2 hr 30 min.

FIG. 6 shows the application of the device to a large cast iron drain pipe. This device is then expected to establish a thermal discontinuity at the level of the flooring 1.

The elements already described with reference to FIG. 1 are again employed with the following differences : the lower pipe 3 stops at the level of the base of the housing 5, and the pipes 2 and 3 are interconnected by a single sleeve 30 which extends through the flooring and the housing. This sleeve is chosen from a material which is very rapidly degraded under the effect of heat. There will therefore be chosen, for example, a fusible alloy such as "Zamak" or antimonious lead. There may also be chosen a plastics material which is degraded without leaving a trace under the action of heat, such as polypropylene. Moreover, the ring 26 and the filling of plaster 28 shown in FIG. 1 are eliminated. In this embodiment, only the part of the sleeve 30 located in the housing melts and falls inside the cast iron pipe 3 without hindering the closure of the flaps 17 and 18. On the other hand, at the level of the ring 6, there is no danger of a premature combustion which would liberate too soon the swellable mass 27, since the whole of the device is relatively protected from the fire by the cast iron pipe. The sleeve 30 therefore in this case performs, in the region of the housing, the function of the polypropylene of FIGS. 1 and 5 and, in the region of the ring, the function of the PVC of the embodiments of these Figures.

FIG. 7 shows the device after operation in the course of a fire, this operation being easily understood from the foregoing description.

In the embodiment shown in FIGS. 1 to 7, the diameter of the ring 6, which is distinctly smaller than the horizontal dimensions of the housing 5, results in a saving of "Palusol." Indeed, the dimensions of the housing 5 are of necessity large to permit disposing therein the flaps which adjoin each other when swung down.

The arrangement shown in FIG. 8 permits reducing still further the mass of "Palusol" necessary : the case 4 is a cylinder in one piece partly embedded in the flooring 1 and provided with a flange 31 for securing it to the flooring.

The pipes 2 and 3 are of polypropylene and are directly connected to each other at the level of the lower part of the flooring. The case 4 is filled with "Palusol" 32 which is wound in a spiral between the coils of which there is disposed a film of a material which gives off a large amount of heat under the effect of an outside supply of heat, such as nitrocellulose. When a fire breaks out, the lower part of this mass, which is directly exposed to the fire, very rapidly swells as soon as the pipe 3 disappears and thus produces a quasi-instantaneous closure similar to the action of the flaps 17,18 of the preceding embodiments. Then the heat is propagated upwardly and causes the progressive swelling of all of the "Paulsol."

It will be understood that the nitrocellulose may also be incorporated in the "Palusol" in the other embodiments for accelerating the swelling, or, in the case of FIG. 8, nitrocellulose may only be provided in the part of the case outside the flooring.

In the embodiments shown in FIGS. 9 to 11, the fire-resisting device is adapted to equip a vertical piping having an X—X in the region where it passes through a thick horizontal flooring 41 which acts as a fire-resisting means, and, more precisely, to interconnect two pipes 42 and 43 of this piping. This device comprises a metallic annular case 44 which has an axis X—X and is substantially undeformable by the effect of heat, for example of sheet steel, a first portion or housing 45 of which case is completely located under the flooring and the second portion or ring 46 of which case is embedded in a recess or cylindrical counterbore 47 formed in the lower part of the flooring. This recess 47 has a diameter exceeding that of the aperture 48 of the flooring for receiving the piping 42, 43. The case 44 is defined internally by a tubular element which comprises the ends of the pipes 42 and 43 and/or sleeves connected thereto and defines through this case and through the flooring a passage having an axis X—X and a diameter roughly equal to the diameter of the piping 42, 43.

In the embodiment shown in FIG. 9, the vertical piping 42, 43 is of polypropylene commercially available under the trademark "Avalene." The pipe 42 slightly penetrates the upper part of the flooring and the pipe 43 is roughly flush with the lower face of this flooring. A sleeve 49 interconnects the pipes 42 and 43.

This description will relate successively to the housing 45 placed in contact with the lower face of the flooring, then to the swellable ring 46 disposed in the recess 47, and then to the sleeve 49.

The housing 45 is parallel-sided with a base 50 which is substantially rectangular and perpendicular to the pipe 43, the housing having a thickness, measured in the axial direction, of the order of one half of the other two dimensions. The lower side 50 of the housing has in the center thereof a circular opening 51 for the passage of the pipe 43. The Figure relates to a sectional view perpendicular to two of the vertical opposed walls, 52, of the housing. This housing comprises in the upper part thereof at the ends of the walls 52, flanges 64 provided with apertures having an axis 54 for securing the housing under the flooring. Inside the housing 45, two opposed lower edges 53 are provided with hinges 56 on which two flaps 57 and 58 are pivotably mounted. These flaps have such length that the ends 59, 60 thereof opposed to the hinges 56 can come into contact with each other when the flaps have been swung to a horizontal position. These ends 59 and 60 are provided with a flange, namely a flange 59 at a right angle and a flange 60 at an obtuse angle. These two flanges, by the oblique contact therebetween in the swung-over position of the flaps shown in dot-dash line in FIG. 9, impart to the flaps a good sealing property. At rest (FIG. 9), the flaps 57 and 58 are maintained in a raised position since they are supported by the free edges thereof against the pipe 43. The space between the flaps 57 and 58 and the facing vertical walls 52 is occupied by masses 61 constituted by vertical plates of swellable material placed under a plastics film. This material is aqueous sodium silicate sold under the trademark "Palusol" and has the property of swelling in a direction perpendicular to the plane of the plates and foaming under the action of heat.

The ring 46 is supported in the flooring by a flanged sheath 62 which will now be described. This sheath comprises, in the upper part thereof, a cylindrical portion 63 of such diameter that it defines around the pipe an annular space whose radial width is roughly equal to 1/5 of the diameter of this pipe. In the lower part, the sheath 62 has a radial flange 64. Inside the cylinder 63, the flange 64 forms a washer 65 which defines the lower end of the space formed around the pipe by the ring 46 and surrounding the upper end of the pipe 43. Outside the cylinder 63, the flange 64 has apertures having the same axes 54 as the apertures of the flange 53 of the lower housing 45, so that the sheath 62 and the housing 45 may be together secured to the lower face of the flooring by means of screws 64$^a$. A planar collar 66 closes the upper end of the ring 46 and is internally in contact with the sleeve 49. The annular space defined by the ring 46 and the sleeve 49 is filled with "Palusol" 67 which is wound into a spiral and protected by a plastics film.

Note that, by way of a modification, the collar 66 may be eliminated since its sole function is to protect from dampness the "Palusol" of the ring 46 all of which is already protected by a film of polyethylene.

Between the aperture 48 in the flooring 41, the lower end of the pipe 42 and the extension of the sleeve 49, a plaster filling 68 completely closes the flooring around the pipe.

The sleeve 49 is a tubular section the length of which exceeds the height of the ring 47 and is made from polyolefin having a filler in the following proportions:
  plastics material : 30 to 50% by weight;
  mineral filler : 50 to 70% by weight.

The plastics material is homopolymer or copolymer polypropylene or a high-density polyethylene having a density of between 0.945 and 0.955.

The mineral filler is one of the following materials : talc, alumina hydroxide, calcium carbonate, or mica. It may also be a mixture of these substances.

Optionally, the mixture may comprise, in a proportion of 10% of the total weight of the plastics material and the filler, a fireproof compound for example based on bromine.

It has been found that the above-defined filled material behaves upon application of heat roughly in the same way as PVC, that is to say, instead of having a distinct point of fusion and burning while running as polyethylene or polypropylene which do not have a filler, it gradually softens under the effect of heat before becoming degraded. Moreover, these transformations occur without any emanation of toxic or corrosive gas, such as chlorine, as opposed to the thermal degradation of PVC.

To connect the sleeve 49 to the pipes 42 and 43, it is possible, as in the foregoing embodiments, to form two socket joints. But it is preferable to employ the affinity that the polyolefins have for each other to effect the connections by a direct welding of the end edges of the sleeve to those of the pipes, as shown in FIG. 9. For this purpose, there may be advantageously employed the "mirror welding" technique described in French Pat. No. 1,183,622. In this technique, to interconnect two pipes of plastics material having a reciprocal affinity a plate is heated and then the two end edges are applied against each side of the plate so as to soften them, then these two end edges are applied against each other and this results in the weld. In the case of FIG. 9, there is thus obtained a perfect continuity of the tubular wall on each side of the flooring and a strict insulation of the swellable material 67 with respect to the liquids following in the piping.

When a fire breaks out under the flooring 41, the device just described operates in the following manner:

At the start of the fire, very rapidly, within a maximum of a few minutes, the lower pipe 43 is destroyed by fusion, without leaving any trace, up to the level of the flooring 41. The space between the flaps 57 and 58 is therefore cleared and, as these flaps are no longer retained, they instantaneously swing over under the effect of their weight and form at the lower end of the housing 42 a metallic closure such as shown at 57$^a$, 58$^a$ in FIG. 9. At the same time, as the housing 45 is directly exposed to the heat, the swellable masses 61 swell radially until they fill the whole of the housing. In doing so, they possibly aid the flaps to swing over and produce a first fire-resisting mattress.

As the fire continues to develop, the heat gradually reaches the ring 46 which is protected to a certain extent by the flooring 41 and the housing 45 filled with swellable material. The sleeve 49 therefore starts to soften owing to the properties mentioned hereinbefore of the filled polyolefin whereas, under the effect of the same heat, the swellable mass 67 starts to swell. There is therefore a progressive constriction or throttling of the sleeve 49 until a complete closure of the piping, this sleeve being finally reduced to a small carbonaceous mass on the axis of the piping. The device is then in the state shown in FIG. 10.

It will be understood that, in the course of its expansion, the swellable mass 67 is maintained at the level of the flooring by the metallic washer 65 and, radially, by the sleeve 49 which it deforms. Moreover, when this mass starts to expand, the whole of the housing 42 is already filled with foam, and there is no danger of the component plates of the mass 65 falling and consequently reducing the capacity of the sleeve 49 to be constricted and thereby close in this region.

The device consequently operates in two main stages : an instantaneous closure by the flaps, then a throttling at the level of the ring 46. The material 61 increases the effective time of the device but the essential feature resides in the partial and temporary insulation of the ring 46 to allow it time to swell, this time being relatively long for large drain pipes. In certain applications, the material 61 could therefore be eliminated and possibly replaced by a mechanical device for swinging down the flaps, for example springs.

FIG. 11 shows the application of the device to a large cast iron drain pipe. This device is expected to establish a thermal discontinuity at the level of the flooring 41.

The elements already described with reference to FIG. 9 are employed with the following differences: the lower pipe 43 stops at the level of the base of the housing 45 and the pipes 42 and 43 are interconnected by a sleeve 69 which extends through the flooring and the housing. This sleeve is connected to the pipes 42 and 43 by two socket joints. The plaster filling 68 and the ring 6 of the embodiment of FIG. 9 are eliminated.

The sleeve 69 comprises two parts, welded end to end, namely an upper part 70 which extends through the flooring and is constituted by a filled polyolefin such as that described hereinbefore. The lower part 71 is of non-filled polypropylene. By way of a modification, this part 71 may be of another plastics material which is degraded without leaving a trace under the action of heat, and in particular a non-filled polyolefin or a fusible alloy such as "Zamak" or antimonious lead. It will be understood that, when the materials of the parts 70 and 71 have no unity in their form, a socket joint is employed for interconnecting these two parts of the sleeve 69.

This device operates in an identical way to the device described with reference to FIGS. 9 and 10.

Although the invention may be easily adapted to the passage of any piping through a vertical wall, it is particularly appropriate in the case described in the foregoing embodiments of a large drain pipe extending through a horizontal flooring.

Having now described our invention what we claim as new and desire to secure by Letters Patent is:

1. A fire-resisting device for interconnecting two pipes of a piping extending through a wall, and in particular a horizontal flooring, comprising an annular case having a first portion which projects from the wall and a second portion which is embedded in said wall, a tubular element which is connected to the two pipes and defines a passage through the case and comprises a first section and a second section located respectively in the first portion and the second portion of the case, said tubular element being of a material which is rigid at ordinary temperature and capable of softening under the effect of heat, at least said first section being of a fusible material having a distinct fusion point, means combined with said first portion of the case for instantaneously closing said passage as soon as said first section has disappeared, and a material which is capable of radially swelling under the action of heat filling said second portion of said case.

2. The device of claim 1, wherein said second section of the tubular element is of a material which, under the effect of heat, is capable of softening without running before decomposition thereof.

3. The device of claim 2, wherein said second section is of polyvinyl chloride.

4. The device of claim 1, wherein the tubular element is constituted by a single fusible sleeve.

5. The device of claim 1, wherein said first section is of a plastics material which is different from polyvinyl chloride.

6. The device of claim 5, wherein said plastics material is polypropylene.

7. The device of claim 1, wherein said first section is of a metal the point of fusion of which is lower than 400° C.

8. The device of claim 1, wherein said first section is of a metallic alloy the point of fusion of which is lower than 400° C.

9. The device as claimed in claim 7, wherein said first section is of antimonious lead.

10. The device as claimed in claim 8, wherein said first section is of antimonious lead.

11. The device of claim 1, wherein said instantaneous closing means comprise at least one flap which is pivotably mounted in said first portion of the case and maintained in a raised position by bearing against said first section.

12. The device of claim 11, wherein the space between the flap and said first portion of the case is filled with a material which is capable of radially swelling under the effect of heat.

13. The device of claim 1, wherein said instantaneous closing means comprise a first material which is capable of swelling under the action of heat combined with a second material which is capable of giving off heat under the action of an outside supply of heat, said two materials filling the first portion of the case.

14. The device of claim 13, wherein the second material is nitrocellulose.

15. The device of claim 13, wherein the first material is coiled into a spiral around said first section, the second material being coiled into a spiral between the coils of the first material.

16. The device of claim 1, comprising a radial flange which separates the two portions of the case.

17. The device of claim 1, wherein the diameter of the second portion of the case is less than the diameter of the first portion of the case.

18. The device of claim 2, wherein said second section is of a polyolefin having a filler of a mineral material.

19. The device of claim 18, wherein the polyolefin is selected from the group consisting of homopolymer polypropylenes, copolymer polypropylenes and high-density polyethylenes.

20. The device of claim 18, wherein the polyolefin is a high-density polyethylene and has a density of between 0.945 and 0.955.

21. The device of claim 18, wherein the mineral filler is selected from the group consisting of talc, alumina hydroxide, calcium carbonate, mica and a mixture of said substances.

22. The device of claim 18, wherein the polyolefin having a filler comprises 30 to 50% by weight of plastics material and 50 to 70% by weight of mineral filler.

23. The device of claim 18, wherein the polyolefin having a filler comprises a fire-proofing compound.

24. The device of claim 23, wherein the proportion by weight of the fire-proofing compound in the polyolefin having a filler is less than 10%.

25. The device of claim 18, for interconnecting two pipes of polyolefin, wherein said second section is directly welded in end-to-end relation to the two pipes of the piping.

26. The device of claim 18, for interconnecting two pipes of cast iron, wherein said second section is welded in end-to-end relation to the first section which is of polyolefin which is devoid of a filler.

* * * * *